(12) United States Patent
Wiemann et al.

(10) Patent No.: US 7,656,874 B2
(45) Date of Patent: Feb. 2, 2010

(54) DATA TRANSMISSION RECORD KEEPING METHOD

(75) Inventors: Henning Wiemann, Aachen (DE);
Joachim Sachs, Aachen (DE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 504 days.

(21) Appl. No.: 10/598,493

(22) PCT Filed: Mar. 5, 2004

(86) PCT No.: PCT/EP2004/002287

§ 371 (c)(1),
(2), (4) Date: Aug. 31, 2006

(87) PCT Pub. No.: WO2005/099213

PCT Pub. Date: Oct. 20, 2005

(65) Prior Publication Data

US 2008/0095166 A1 Apr. 24, 2008

(51) Int. Cl.
*H04L 12/28* (2006.01)
(52) U.S. Cl. .................................................. 370/394
(58) Field of Classification Search ......... 370/412–419, 370/395.4, 395.41, 395.42, 473–474, 535, 370/337; 714/18, 20
See application file for complete search history.

(56) References Cited

U.S. PATENT DOCUMENTS

| 4,703,475 | A | | 10/1987 | Dretzka et al. |
| 5,414,455 | A | * | 5/1995 | Hooper et al. ................. 725/88 |
| 5,721,815 | A | * | 2/1998 | Ottesen et al. .............. 715/721 |
| 5,768,271 | A | * | 6/1998 | Seid et al. .................... 370/389 |
| 6,578,070 | B1 | * | 6/2003 | Weaver et al. ............... 709/206 |
| 6,848,117 | B1 | * | 1/2005 | Emura .......................... 725/87 |
| 7,180,895 | B2 | * | 2/2007 | Smith .......................... 370/394 |
| 7,352,727 | B2 | * | 4/2008 | Beckmann et al. .......... 370/338 |
| 7,490,344 | B2 | * | 2/2009 | Haberman et al. ............ 725/98 |

FOREIGN PATENT DOCUMENTS

EP 0 998 094 A 5/2000
EP 1 089 495 A 4/2001

OTHER PUBLICATIONS

Sachs et al, Integration of Multi-Radio Access in a Beyond 3G Networks, IEEE, 6 pages, 2004.*
Sachs, A Generic Link Layer for Future Generation Wireless Networking, IEEE, 5 pages, 2003.*

* cited by examiner

*Primary Examiner*—Frank Duong

(57) ABSTRACT

In a sending peer of a data unit transmission protocol, a first record of a data symbol stream (10) is maintained in terms of one or more first sequences of data units of a first format A, and simultaneously a second record of a data symbol stream (10) is maintained in terms of one or more sequences of data units of a second format B, where the first and second record have a common reference point (14) to the data symbol stream (10).

49 Claims, 8 Drawing Sheets

DATA TRANSMISSION RECORD KEEPING METHOD

BACKGROUND

The present application relates to a method of keeping a record of a data transmission, to a method of controlling a sending peer of a data unit transmission protocol and to a corresponding sending peer, as well as to a method of controlling a receiving peer of a data unit transmission protocol and to a corresponding receiving peer.

The present invention relates to the field of communication via data unit transmission. In data unit communication, a stream of data symbols (e.g. bits or bytes) is divided by a sender into units, sent over an appropriate transmission network to a receiver, and the receiver reconstructs the data symbol stream on the basis of the received data units. Usually, this is performed in the context of a layering scheme (such as the OSI scheme), i.e. where a sending peer of a given protocol receives a data symbol stream from a higher layer, generates data units in accordance with the given protocol to which the sending peer adheres, and passes the generated data units to lower layers. On the receiving side, the receiving peer receives the data units from the lower layer, reconstructs the data symbol stream, and passes the reconstructed data symbol stream to the higher layer. The concept of dividing a data symbol stream into data units and the concept of layering are well known in the art, such that a further explanation is not necessary here.

It is noted that such sub-divisions of data are referred to by a variety of names, such as packets, segments, frames, protocol data units, service data units, etc. In the context of the present specification and claims, the term "data unit" is used generically to relate to any such sub-divisions of data for the purpose of communication.

FIG. 5 is a schematic representation of a sending and a receiving peer of a communication. More specifically, two peers 51 and 52 of a predetermined layer LX are shown. The layer LX can e.g. be the link layer L2. For the purpose of the present explanation it will be assumed that peer 51 is acting as sending peer and peer 52 as receiving peer. In this case sending peer 51 receives a stream of data symbols from higher layer LX+1. Sending peer 51 comprises a data unit generating part 510, e.g. a buffer, and a control part 511, e.g. a processor for controlling the data unit generating part 510. Furthermore, it is assumed that a plurality of channels 53 for lower layer LX−1 exist, and that sending peer 51 comprises a switching part 512 for selecting a channel, where control part 511 controls the data unit generator 510 in such a way that data units of the correct format are generated for a given channel. In other words, each of the channels is associated with a particular data unit format. The lower layer LX−1 (and possibly layers below LX−1) provide a connection 55 to receiving peer 52, where the data units arrive over channels 54 that correspond to the channels 53. Consequently receiving peer 52 has a switching part 522 for receiving data units from the appropriate channel 54, and the data units are processed in a part 520 that serves to reconstruct the data symbol stream under control of a control part 521. The reconstructed data symbol stream is passed to higher layer LX+1.

For example, if LX is the link layer L2, then the various channels 53, 54 can e.g. relate to a variety of different physical communication paths, such as a variety of WCDMA (Wideband Code Division Multiple Access) connections, a HSDPA (High-Speed Down Link Packet Access) connection, a GSM (Global System for Mobile Communication) connection, a WLAN (Wireless Local Area Network) connection, or some other wireless type of connection.

In order for the receiving peer 52 to be able to reconstruct the data symbol stream, each data unit carries a sequence position indicator that indicates a position in a sequence of data units. By correctly ordering the sequence in accordance with the sequence position indicators, the receiving peer can reconstruct the data symbol stream.

In the scenario of FIG. 5, it is assumed that at least some of the channels 53, 54 require data units of a different format (e.g. of a different size).

As a consequence, if the sending peer 51 is in the process of sending data units over one of the channels 53 in accordance with a format associated with said channel, then it keeps a record of the amount of sent data symbols of said data symbol streams in terms of the data units of the format being used. In other words, the sending peer keeps a record of a sequence of data units in terms of the sequence position indicators where the records shows which data units have been sent and which have not.

In the situation as indicated in FIG. 5, the following can occur. It can become necessary or desirable to switch from a given channel (and given data unit format) to a new channel (and therefore possibly new data unit format) during the ongoing transmission of a data symbol stream. In order to guarantee a correct reconstruction of the data symbol stream at the receiving peer, it is envisionable to purge the sending buffer in data unit generator 510 together with all of the corresponding records kept in terms of the initial data unit format and corresponding sequence position indicators, and to restart sending with the new data units in their new format, where the corresponding new sequence position indicators are also reset, i.e. start at the initial value (zero or one).

Such a procedure for purging a send buffer and resetting the corresponding records may lead to a number of disadvantages. For one thing, the purging can lead to a loss of parts of the data symbol stream. Also, if ARQ (Automatic Repeat Request) is implemented between the sending peer 51 and receiving peer 52, then there the problem that after a switch in channels and in formats, it is difficult to appropriately retransmit lost or damaged data units.

SUMMARY

It is the object of the present application to provide an improved method of managing data units in a system where data units can be sent in at least a first format and a second format from a sending peer to a receiving peer.

SUMMARY OF THE INVENTION

The object is solved by the methods and devices described in the independent claims. Advantageous embodiments are described in the dependent claims.

In accordance with the present invention, a sending peer of a data unit transmission protocol that is capable of dividing a data symbol stream into data units of at least a first format and a second format maintains a first record of the data symbol stream in terms of one or more first sequences of data units of the first format and simultaneously maintains a second record of the data symbol stream in terms of one or more second sequences of data units of the second format. The first record and second record have a common reference point to the data symbol stream, e.g. the beginning of the respective first data unit.

Due to the simultaneous record keeping it is not necessary to purge a sending buffer or reset records when switching from the first format to the second format. The sending peer is capable of dynamically switching between a first transmission mode for sending data units in the first format and a second transmission mode for sending data units in the second format, where it is not necessary to reset the sequence position indicators after the switching in transmission mode. Namely, after switching from the first transmission to the second transmission mode, the transmission continues with a given data unit of one of the second sequences comprising a position indicator such that the given data unit comprises a data symbol immediately following the last data symbol of the data symbol stream that was sent in the data unit of the first format last sent before the switching. Equally, after switching from the second transmission mode to the first transmission mode, the transmission continues with a given data unit of one of the first sequences comprising a position indicator such that the given data unit comprises a data symbol immediately following the last data symbol of the data symbol stream that was sent in the data unit of the second format last sent before the switching.

It is noted that there can naturally be more than two formats, in which case the sending peer may keep respective records for each format.

The receiving peer of the present invention is capable of identifying the respective sequence position indicator associated with the first sequence of the first format or second sequence of the second format, and is capable of detecting the switching of the sending peer between the first transmission mode and second transmission mode. The reconstructing of the data symbol stream occurs on the basis of the identified sequence position indicators and the detected switching.

It is noted that the receiving peer does not necessarily have to keep a first and a second record respectively associated with the first sequence of data units of the first format and second sequence of data units of the second format, using a common reference point to the data symbol stream. Namely, it is possible that the receiving peer reconstructs the data symbol stream using dedicated instruction messages from the sending peer. In other words, the sending peer sends instruction messages to the receiving peer, where the instruction messages tell the receiving peer how to assemble the data symbol stream on the basis of the data symbols of the first and second format and the associated sequence position indicators of the respective formats.

However, it is preferable that the receiving peer maintains a first record associated with the data units of the first format and a second record associated with the data units of the second format, and reconstructs the data symbol stream on the basis of a common reference point of the first sequence of data units of the first format and the second sequence of data units of the second format.

BRIEF DESCRIPTION OF THE SEVERAL VIEWS OF THE DRAWINGS

In the following examples of the present invention will be described on the basis of detailed embodiments, which make reference to figures, where.

DETAILED DESCRIPTION

Figure 1:
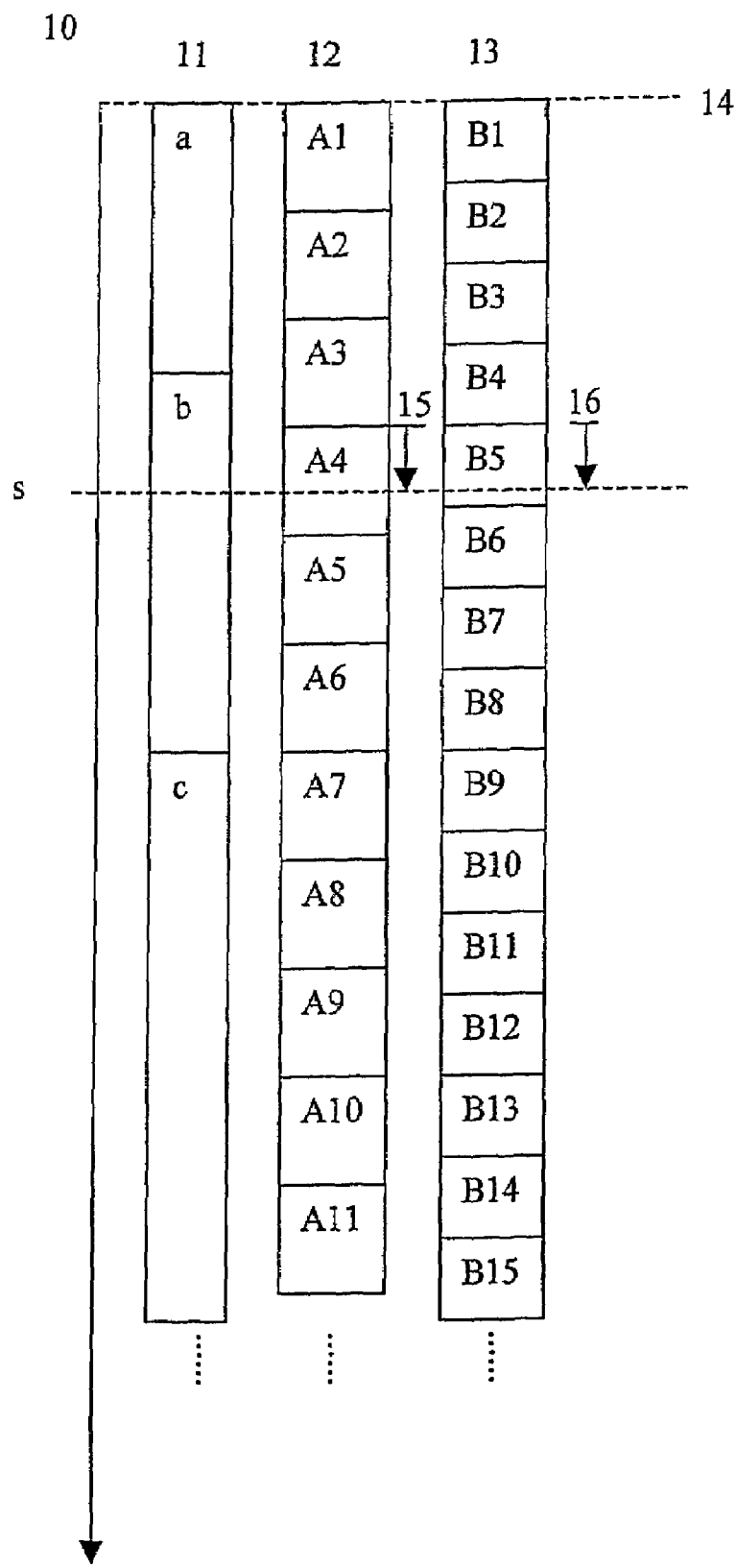
FIG. 1 schematically shows an example of a first sequence of data units of a first format and a second sequence of data units of a second format, FIG. 2 schematically shows an example of sent data units and received data units, FIG. 3 schematically shows three first sequences of data units of the first format and two second sequences of data units of the second format, where there are respective offsets between the data units of the first sequences and the second sequences, FIG. 4 schematically shows an example where the data unit size is variable, FIG. 5 schematically shows a sending peer and receiving peer, in which the concepts of the present invention can be implemented.

FIG. 1 schematically shows an example of a method of keeping a record of a data transmission in a sending peer in accordance with the present invention. Arrow 10 represents a data symbol stream. The data symbols can be present in any suitable or desirable way, e.g. can be bits, bytes, etc. The data symbol stream can already have a certain structure as provided from the higher layer, e.g. can be divided into higher layer data units. This is indicated by sequence 11 of data units a, b, c. For example, if the data units being generated belongs to the link layer L2, then the data units a, b, c of sequence 11 could be protocol data units (PDUs) of layer L3.

In accordance with the present embodiment of the invention, a sending peer of a data unit transmission protocol that is transmitting data symbol stream 10 maintains a first record of the data symbol stream 10 in terms of a first sequence 12 of data units A1-A11 of a first format A, and simultaneously maintains a second record of the data symbol stream 10 in terms of a second sequence 13 of data units B1-B15 of a second format B. The first and second record have a common reference point 14 to the data symbol stream 10.

Figure 6:
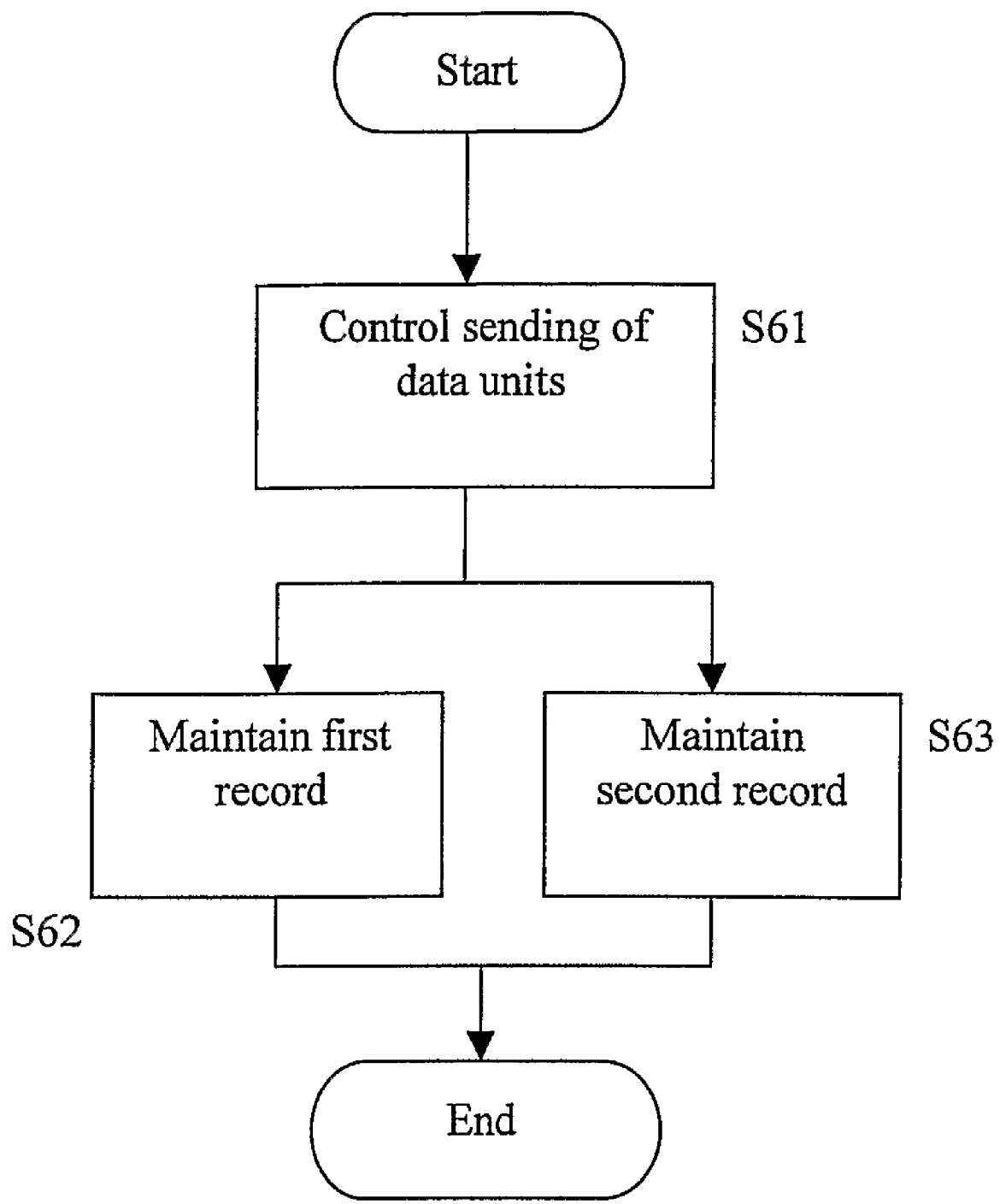
FIG. 6 shows a flow chart of an embodiment of the present invention.

An example of such a method is shown in FIG. 6. Step S61 represents the procedure for controlling the transmission of data units, and steps S62 and S63 represent the simultaneous maintenance of corresponding records with respect to the associated formats, regardless of which format was used in the actual sending. Naturally, the procedure of FIG. 6 is only an example, and other embodiments are possible, e.g. steps S62 and S63 may also be conducted sequentially, as this still leads to a simultaneous record keeping with respect to the two formats. Although not shown in FIG. 6, the keeping of more than two records for corresponding more than two formats is also possible and straight-forwardly achieved.

Each sequence 12, 13 has sequence position indicators for identifying the correct position in the respective sequence. In FIG. 1 these sequence position indicators are shown as simple numbering, together with an indication of the respective format. Therefore, e.g. "A1" represents the data unit of format A having the sequence position 1, "B3" represents the data unit of format B having the sequence position 3, etc.

It is noted that the data units A1-A11 and B1-B15 represent the payload of actual data units. However, as shall be explained in the following with reference to FIG. 2, not every shown data unit is actually sent. Much rather, FIG. 1 signifies that a record is simultaneously kept in terms of both shown formats, in order to allow a dynamic switching between sending data units of format A from sequence 12 or data units of format B from sequence 13.

FIG. 1 is only a schematic representation, and the record can be kept in any suitable or desirable way. For example, the record can be provided by a mapping between data symbol positions and the respective sequence position indicators. The sequence position indicators can e.g. be simple whole numbers, as indicated in FIG. 1. However, there are also other possibilities. For example, the data symbol positions can themselves be used as sequence position indicators. Namely, the last data symbol position in a data unit can be used for identifying the data unit. For example, if one assumes that the data units of format A have a length of N data symbols, then (assuming a starting point of data symbol number 1) A1 can be identified by data symbol number N, A2 by data symbol number 2N, etc.

All records can be kept in the same fashion, or one record can be kept by means of a conversion function from another record. For example, when using natural numbers as sequence position indicators, the sequence position indicator for format A can e.g. be determined from the sequence position indicators for format B by:

$$No(A) = \left\lfloor No(B) \cdot \frac{Len(B)}{Len(A)} \right\rfloor + 1$$

where No(A) indicates the sequence position number for format A, $\lfloor \ \rfloor$ indicates an integer truncation, No(B) indicates the sequence position number for format B, Len(A) indicates the length of data units of format A, and Len(B) indicates the length of data units of format B.

In some data transmission systems the sequence position numbering space is limited. In such cases, a so-called wrap-around may occur. For example, if the sequence position is given by 10 bits, then a wrap-around will occur every 1024 positions. In general, this problem can be solved by employing an appropriate modulo operation in the addressing of a given data symbol position in terms of a specific data unit format, and equally using modulo operations when converting from sequence position indicators in one format to sequence position indicators in another format.

In the following, a specific example of record keeping in such a situation will be explained. For this example, a constant data unit length is assumed. It will also take into account the possibility of a wrap-around occurring in the sequence position numbering.

In FIG. 1, the reference s represents a data symbol position in stream 10. In terms of the first sequence 12 of data units of format A and second sequence 13 of data units of format b, the symbol position s can be represented or addressed as $\{SN_A(s); Pos_A(s)\}$ in terms of format A and as $\{SN_B(s); Pos_B(s)\}$ in terms of format B. $SN_A(s)$ represents the sequence position of the corresponding data unit in the first sequence of format A, $SN_B(s)$ represents the sequence position of the corresponding data unit in the second sequence of format B, $Pos_A(s)$ represents the position of s within the data unit of format A and $POS_B(s)$ represents the position of s within the data unit of format B. In the example of FIG. 1, $SN_A(s)$ would be A4, $SN_B(s)$ would be B5, and arrow 15 represents $Pos_A(s)$ and arrow 16 represents $Pos_B(s)$.

The representation of s in a format X, i.e. $\{SN_x(s); Pos_x(s)\}$, can be determined as:

$$SN_X = \left\lfloor \frac{s \bmod (MaxSN(X) \cdot Len(X))}{Len(X)} \right\rfloor$$

$$Pos_X = [s \bmod (MaxSN(X) \cdot Len(X))] \bmod Len(X)$$

where the reference point is assumed as shown in FIG. 1, i.e. $\{SN_x(s=0)=0; Pos_x(s=0)=0\}$.

$\lfloor \ \rfloor$ represents an integer truncation and a mod b represents a modulo operation. MaxSN(X) is the maximum of the limited sequence position numbering space, and Len(X) is the length of a data unit (more specifically the length of the payload of a data unit) of format A.

In addition, for each format X, a reference value $Ref_x(s)$ can be determined, which specifies the effect the offset of the representation window start and the reference point:

$$Ref_X(s) = MaxSN(x) \cdot Len(X) \cdot \left\lfloor \frac{s}{MaxSN(X) \cdot Len(X)} \right\rfloor$$

An arbitrary format A can then be converted into an arbitrary format B as follows:

$$SN_B(s) = \left\lfloor \frac{(SN_A(s) \cdot Len(A) + Pos_A(s) + \Delta(s)) \bmod (MaxSN(B) \cdot Len(B))}{Len(B)} \right\rfloor$$

$$Pos_B(s) =$$
$$[(SN_A(s) \cdot Len(A) + Pos_A(s) + \Delta(s)) \bmod (MaxSN(B) \cdot Len(B))] \bmod Len(B)$$

where $\Delta(s)=Ref_A(s)-Ref_B(s)$.

Figure 2:
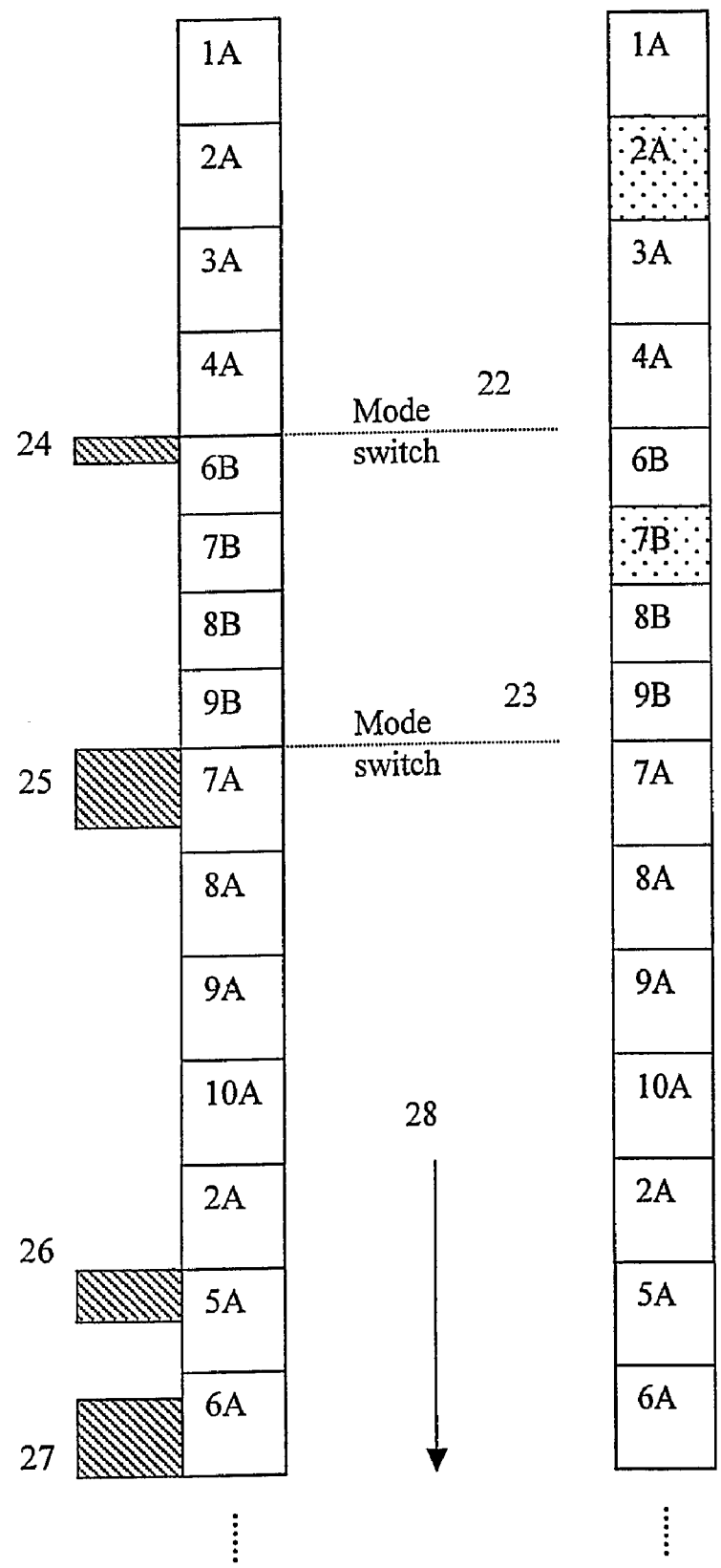

FIG. 2 schematically shows a sequence 20 of data units sent by the sending peer and a sequence 21 of data units received by a receiving peer.

In the example of FIG. 2, the transmission starts with data units of the first format A. The sender sends data units 1A-4A. In order to distinguish the record as shown in FIG. 1 from the actual data units sent, the data units of FIG. 2 are identified by the sequence position indicator (1, 2, . . . ) following by the format indicator (A, B), as opposed to the reference in FIG. 1, where the sequence position indicator follows the format indicator.

In the example of FIG. 2, at point 22 a mode switch occurs in the sending peer. Namely, the sending peer dynamically switches from the first transmission mode A to the second transmission mode B. There can be a variety of reasons for switching the transmission mode e.g. due to changes in the availability of channels for transporting the data units of the first format A or the second format B. In any case, the present invention is not concerned with the reasons for performing a format switch.

After switching from the first transmission mode A to the second transmission B, the transmission continues with data unit 6B that corresponds to B6 of second sequence 13, because B6 contains the data symbol immediately following the last symbol of the data symbol stream 10 that was sent in data unit 4A before the mode switch 22.

The transmission therefore continues with the data units 6B-9B of second format B, until a further mode switch 23 occurs, back to the first format A. After switching from the second transmission mode to the first transmission mode, the transmission continues with data unit 7A that corresponds to A7 of the first sequence 12, because A7 comprises the data symbol immediately following the last data symbol of the data symbol stream 10 that was sent in data unit 9B before the mode switch 23.

In order to identify the correct data unit after a mode switch, the first sequence 12 and second sequence 13 share a common reference point 14 to the data symbol stream 10. In the example of FIG. 1, the common reference point is the beginning of the data symbol stream, i.e. the first data symbol, where the first data symbol of the data symbol stream is assigned as the first symbol of the data unit carrying the first sequence position indicator in both sequences 12 and 13.

The setting of a reference point in this way is the intuitively most appealing, and therefore preferred. However, the present invention is by no means restricted to such a reference point, as the reference point common to the sequences and the data symbol stream can be chosen arbitrarily and can be adapted dynamically.

Also, it is noted that the term "data symbol stream" relates to any stream of data symbols, i.e. to a complete amount of data for sending or to a contiguous subset of such a complete amount. In other words, in an overall stream of data symbols, the beginning and end for defining the "data symbol stream" can be chosen arbitrarily.

Figure 7:
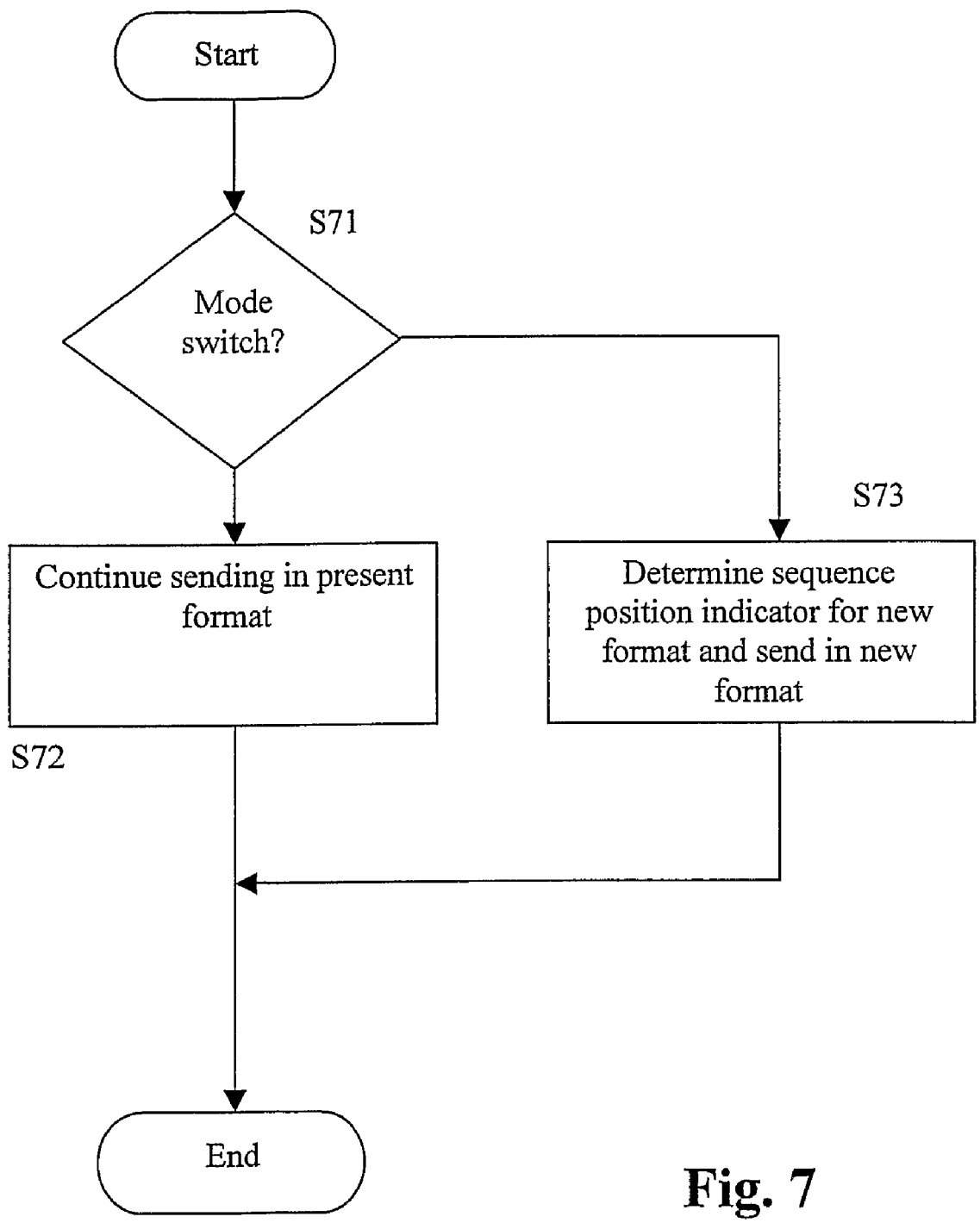
FIG. 7 shows a flow chart of another, embodiment of the invention.

FIG. 7 shows a flow chart of an example of the above described control method. In step S71 it is determined whether a mode switch should occur. If no, the process proceeds to step S72, where the sending of data units continues with the present format. On the other hand, if step S71 indicates a change in mode and thereby in format, then the correct sequence position indicator for the new format is determined in the above described way, and then a data unit of the new format and having the determined sequence indicator is transmitted.

Returning to FIG. 2, the receiving peer receives the sequence 21 of data units of both formats A and B. In order to reconstruct the data symbol stream, the receiving peer identifies the respective sequence position indicators in each received data unit and detects a switching of the sending peer from the first format A to the second format B, as at switch 22, or from the second format B to the first format A, as at switch 23.

Figure 8:
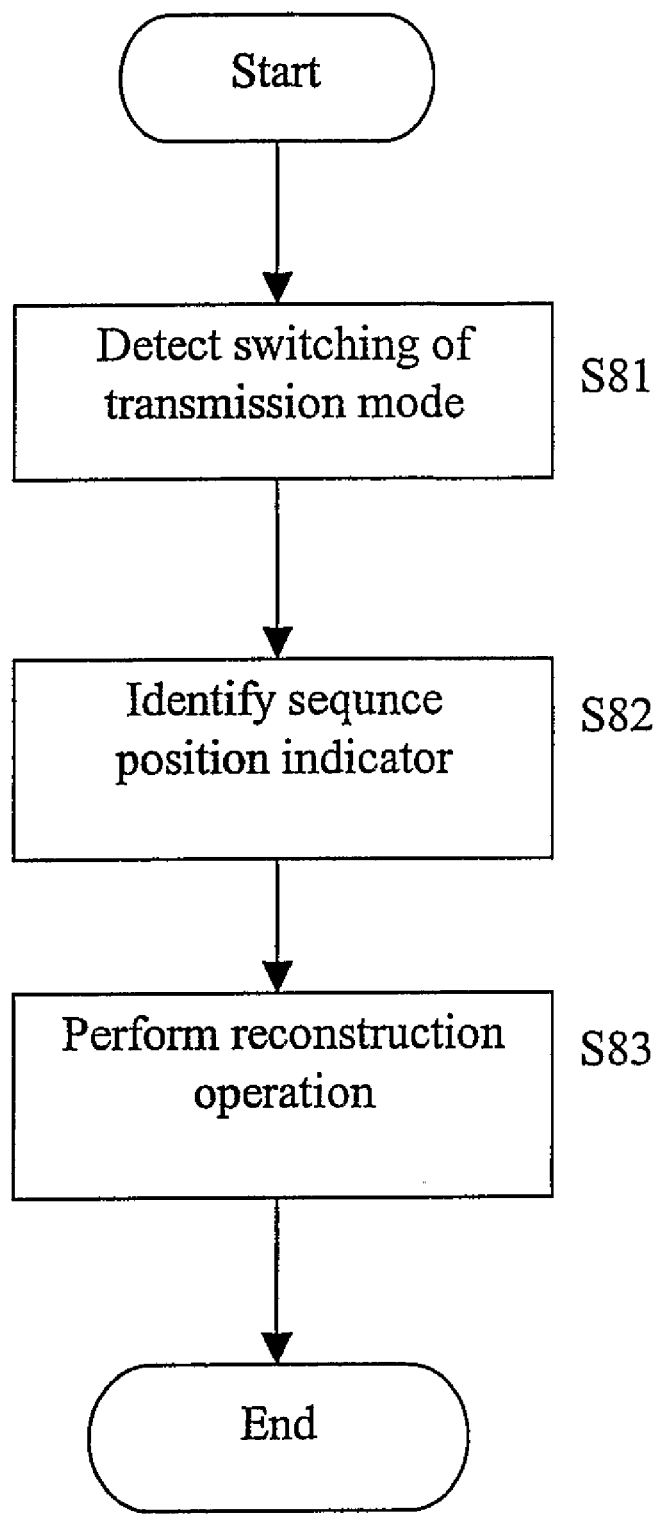
FIG. 8 shows a flow chart of a further embodiment of the invention.

An example of this is shown in FIG. 8. The shown method is conducted after receiving a data unit. In step S81 a switch in transmission mode is detected. Then, in step S82 the sequence position indicator is identified. Finally, in step S83, the reconstruction is performed in dependence on the identified sequence position indicator and on the possibly detected mode switch. Naturally this is only an example, as steps S81 and S82 could also be executed concurrently, or S82 could be executed before step S81.

In order to correctly reconstruct the data symbol stream, the receiving peer is capable of determining how to assemble the data units of the first format A and the second format B at the transmission of a mode switch. This detection can be done in a number of ways. For one thing, it is possible that the sender sends dedicated messages indicating a switch in data unit format, where said messages may also indicate how to assemble the last data unit before the switch and the first data unit after the switch.

Preferably, the receiving peer also maintains a first and a second sequence, similar to what is shown in FIG. 1, using a common reference point to the data symbol stream. The common reference point can be implicitly defined with respect to the sequence position indicators as e.g. shown in FIG. 1. Namely, it can be a common rule known to all sending peers and receiving peers that the reference point is the first data symbol contained in the respective date unit carrying the first sequence position indicator.

However, it is equally possible that the sending peer sends a reference point synchronization message to the receiving peer for setting the reference point, where the receiving peer sets its common reference point on the basis of the reference point synchronization method. The synchronization message can be used for an initial setting or for a subsequent resetting of the reference point.

The change in format at the point in time of a mode switch can be communicated in different ways from the sending peer to the receiving peer. For example, the different formats can be fixedly associated with given channels, as already explained in connection with FIG. 5. In other words, the format is identified by the channel over which the data unit is sent and received. As such, the changing of one channel to another serves to identify the switch in transmission mode by the sending peer.

On the other hand, it is alternatively or additionally possible for the sending peer to send a message indicating an associated switching in data unit format.

As a further alternative or additional possibility, it is possible to send a format type indicator in each data unit. The receiving peer is then arranged to identify the format type indicator from each received data unit, where a change in format and correspondingly a switch in the transmission mode can straight-forwardly be recognised.

Attention is also drawn to the fact that the sequence position indicator provided in the data units can be chosen in any desirable or suitable form. For example, it can be in the form indicated in FIGS. 1 and 2, i.e. a consecutive whole number count. However, the sequence position indicator can also be of the type known from TCP/IP, i.e. can be an indication of the number of data symbols that has been transported. In other words, the sequence position indicator can be a count value that directly relates to the data unit or a count value that relates to the contents of the data unit.

As explained above, the receiving peer is able to reconstruct the data symbol stream on the basis of the identified sequence position indicators and the detected mode switching. When reconstructing the data symbol stream, the receiving peer eliminates the duplicate data symbols that where unnecessarily sent as a cause of the mode switching. This can be explained with reference to boxes 24 and 25 in FIG. 2. Namely, when switching from format A to format B at point 22, the sending of data unit 6B leads to a renewed sending of the data symbols identified by box 24 as an overlap between data units A4 and B6 of FIG. 1. Equally, when switching from format B to format A, at point 23, the data symbols indicated by box 25 are sent twice, as an overlap between data unit B9 and A7 of FIG. 1.

As indicated above, the receiving peer can e.g. identify the redundant data symbols on the basis of dedicated messages from the sending peer, which dedicated messages e. g. identify specifically which part of data unit 6B or 7A to eliminate (e.g. using the values $Pos_x(s)$ described above), or on the basis of the common reference point between the first sequence 12 and the second sequence 13, which common reference point allows to identify the respective overlap between the two sequences 12, 13.

Figure 3:
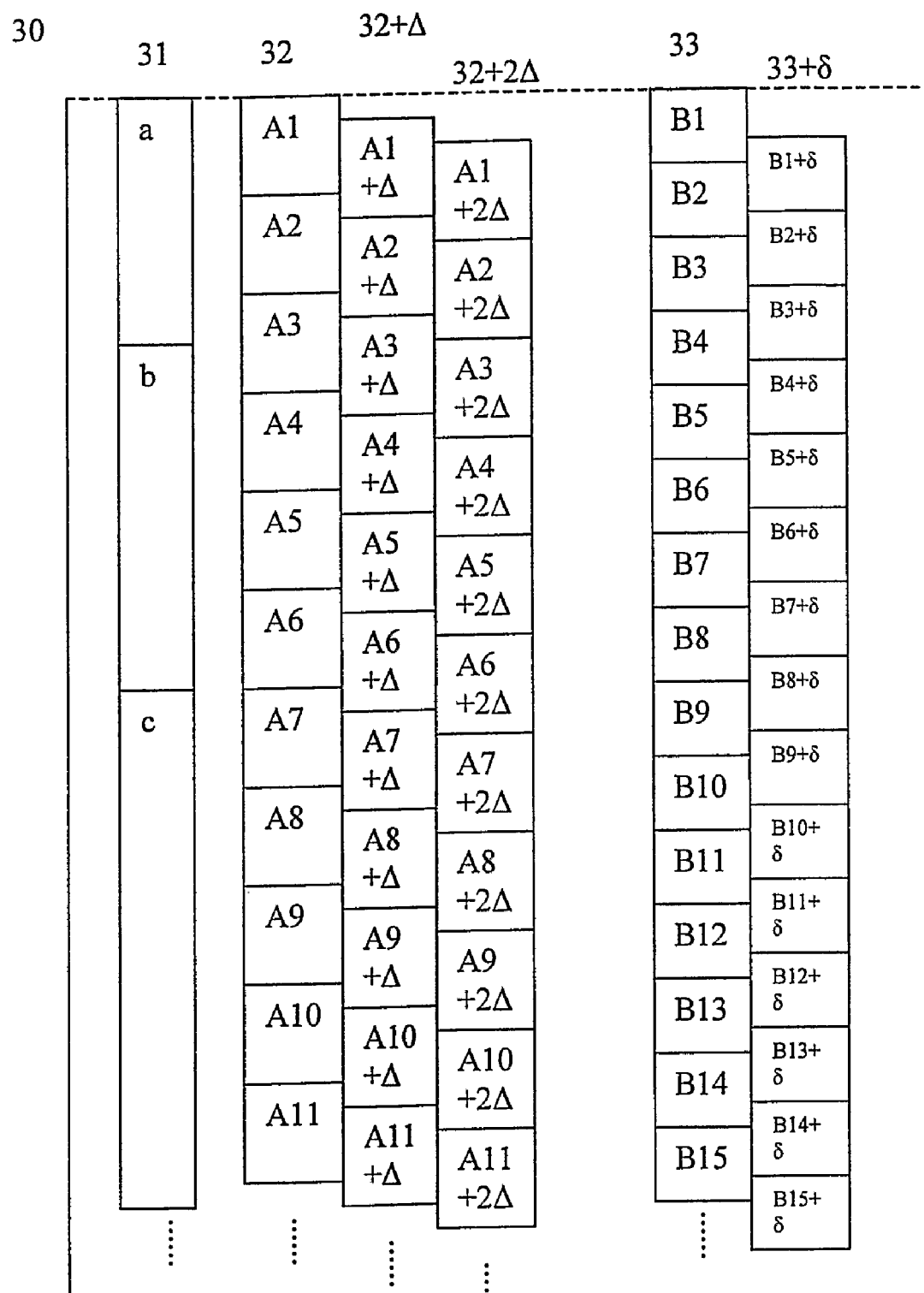

Nonetheless, as can be seen from the above described example, the performance of a mode switch and the subsequent change in data unit format can lead to a considerable amount of redundant or duplicate data transmission. In order to avoid such a redundant transmission of data symbols, the present invention is preferably arranged in a way that will be explained in connection with FIG. 3. As can be seen in FIG. 3, data symbol stream 30, which again may be received in the form of higher layer data units a, b, c, in sequence 31, is not only recorded in terms of a first sequence and a second sequence, but in terms of a plurality of first sequences 32, 32+Δ, 32+2Δ and/or a plurality of second sequences 33, 33+δ. Δ and δ represent respective offsets of the associated sequence with respect to the common reference point. For example, the offsets Δ and δ can be expressed in terms of data symbol positions, e.g. they can be equal to one data symbol position, two data symbol positions etc.

By keeping one or more first sequences 32 and/or one or more second sequences 33, the amount of redundant data symbols transmitted after a mode switch can be reduced in the following way. After switching from the first transmission mode A to the second transmission mode B, the sending peer determines the given data unit of the first of the second sequences, i.e. sequence 33, that comprises the data symbol immediately following the last data symbol that was sent in the last sent data unit of the first format A, and determines the given data unit of the second of the second sequences, i.e. 33+δ, that comprises the data symbol immediately following the last data symbol that was sent in the last sent data unit of the first format A. The sending peer then determines which of the given data units comprises less duplicate data symbols already sent with the last data unit of the first format A, and continues the transmission with that one sequence of said second sequences 33, 33+δ to which the given data unit was less of said data symbols belongs.

Naturally, the same process can be conducted in the inverse direction, i.e. when switching from format B to format A and then identifying which one of the sequences 32, 32+Δ, 32+2Δ contains the data unit that has the smallest overlap with respect to the previously sent data unit of the previous format.

The offset can be communicated to the receiving peer in any suitable or desirable way. For example, it can be sent in a dedicated message that indicates that all following data units have a certain offset. Alternatively or additionally the offset may be communicated by an offset indicator contained in each data unit that is sent. The receiving peer can then read the offset indicator and make an appropriate adjustment with respect to the common reference point.

If the data unit transmission protocol to which the sending peer and receiving peer adhere provides for the sending of receiver status messages from the receiving peer to the sending peer, then the present invention may be embodied in the following way. The receiver status messages comprise information on the receipt of one or more of the data units, where the data units are identified in the messages in terms of sequence position indicators associated with a given sequence, e.g. the first sequence 12 of FIG. 1, or one or more of the first sequences 32, 32+Δ, 32+2Δ as shown in FIG. 3.

The receiver status messages can be chosen in any suitable or desirable form, can e.g. be acknowledgement messages, non-acknowledgment messages, etc.

The sending peer comprises a retransmission procedure for retransmitting data units on the basis of the receiver status messages. It furthermore implements a procedure for determining one or more of the second sequence position indicators B1-B15, B1+δ-B15+δ associated with one of the second sequences 33, 33+δ on the basis of a given first sequence position indicator. The one or more second format data units cover all of the data symbols contained in the given data unit of the first format associated with the first sequence position indicator. For example, looking at the example of FIG. 3, the sending peer is able to identify data units B5, B6 or B4+δ, B5+δ as containing all the data symbols of data unit A4 of format A. Then, the sending peer is capable of performing a retransmission procedure that retransmits the data units of the second format B associated with the identified second sequence position indicators.

In other words, if the sending peer would like to retransmit the data unit carrying A4, e.g. because A4 is identified as defective in a receiver status message or has possibly caused a time-out, then the sending peer is capable of identifying the second format data units, e.g. B5, B6 that can be retransmitted in order to transport the same data symbols as contained in A4.

Naturally, this process is also possible in the inverse direction, i.e. identifying one or more sequence indicators of a first sequence 32, 32+Δ, 32+2Δ on the basis of a given sequence position indicator associated with one of the second sequences 33, 33+δ. An example of this is shown in FIG. 2, where arrow 28 at the bottom represents a data retransmission period. Moreover, the hatching of data units 2A and 7B on the side of receiving peer 21 symbolize that these where not correctly received and that a corresponding receiver status message (not shown in FIG. 2) was sent to the sending peer. In the example of FIG. 2, the retransmission period 28 occurs during a time where the sending peer is in a transmission mode for sending data units of the first format A. As a consequence, the defective data unit 2A is simply retransmitted as it is. However, the sending peer determines the sequence position indicators of the first sequence 12 of FIG. 1, associated with defective data unit 7B of the second format B. These data units are A5, A6, such that the sending peer retransmits data units 5A and 6A in order to transport the data symbols contained in 7B. As indicated by boxes 26 and 27, this can lead to a certain amount of duplicate data symbols being sent. The amount of duplicate data symbols sent can be reduced by using the above described offset principle.

In correspondence to the sending peer, a receiving peer of the present invention is preferably arranged such that it can determine second sequence position indicators on the basis of a first sequence position indicator, in order to generate appropriate receiver status messages. More specifically, the receiving peer preferably implements a procedure for determining one or more second sequence position indicators B1-B15, B1+δ-B15+δ associated with one of the second sequences 33, 33+δ on the basis of a first sequence position indicator associated with one of the first sequences 32, 32+Δ, 32+2Δ, where the determined one or more data units of the second format B associated with the determined one or more second sequence position indicators cover all of the data symbols contained in the given data unit of the first format A associated with the first sequence position indicator. Then, the data unit of the first format A can be identified in terms of the one or more second sequence position indicators in a receiver status message.

In this way, it is possible for the receiving peer to always identify data units in receiver status messages in accordance with one format. Namely, if it receives the data units in that one format, then the identification is straight-forward on the basis of the sequence position indicator contained in that data unit, and otherwise the above-described procedure is used for determining the sequence position indicator from data units of another format. For example, using the embodiment of FIG. 1, the receiving peer could generate receiver status messages that indicate received data symbols in terms of sequence position indicators associated with sequence 12, even if data units of format B have been received.

Preferably, the receiving peer is capable of performing the determination in both directions, i.e. being able to determine one or more first sequence position indicators associated with one of the first sequences 12, 32, 32+Δ, 32+2Δ on the basis of a second sequence position indicator B1-B15, and determining one or more second-sequence position indicators associated with one of the second sequences 33, 33+δ on the basis of a first sequence position indicator A1-A11. In other words, the receiving peer is preferably arranged in such a way that it can identify data symbols sent in a data unit of format A with sequence position indicators associated with data units of format B, and vice versa. This capacity is preferably combined with a procedure for generating received status messages comprising one or both of first and second sequence position indicators depending on one or more predetermined optimisation functions.

Namely, the receiving peer can select which representation of data it wants to use in a receiver status message. It can choose to use the representation with respect to one format, the other format, or to mix the representation with respect to both formats. As an example, when looking at the received data units of sequence 21 in FIG. 2, the receiving peer can identify data unit 2A in terms of format A (as 2A), or in terms of format B (as B2, B3). Equally, the receiving peer can identify data unit 7B in terms of format B (i.e. as 7B) or in terms of format A (as A5, A6).

The one or more optimisation functions to be used can be chosen in any suitable or desirable way. For example, the optimisation function can be used to identify data units in the receiver status messages in terms of the format presently being used by the sending peer. In other words, the receiving peer determines that the sending peer has a transmission mode that sends format A, all data units are identified in the receiver status messages in terms of format A.

A further example of an optimisation function is to optimise the size of the receiver status messages. Namely, in such a case the receiving peer is arranged to represent received data units in terms of the format that allows the shortest identification of data units, i.e. a format that corresponds to data units of large size, such that the receiver status messages become short. This can have the disadvantage that an increased amount of duplicate data symbols are transmitted, because the granularity of identifying data units is very coarse, because the receiver status messages are intended to be short and thereby only very coarsely identify the data units.

As a consequence, the optimisation function can also be chosen in the exactly opposite way, i.e. to allow the finest granularity, which means that the data units are expressed with respect to the format of smallest size.

Now two special cases will be discussed. One special case is that the data symbol stream buffer and the sending peer runs empty for a certain period, such that the last data unit of a given format is partly filled with padding. In order to allow the receiving peer to correctly re-construct the data symbol stream, it is capable of identifying the padding (e.g. on the basis of information in the data unit header that specifies the length and position of the padding) and a certain synchronization rule. The synchronization for determining how the first data symbol of new data is addressed can be implicit, e.g. that the next data symbol is represented in the next data unit of each respective format. In other words, if padding would e.g. be contained at the bottom of data unit A5 of FIG. 1, then the receiver could identify B6 and B7 as corresponding to A5, such that the next data unit of format A is A6 and the next data unit of format B is B8, such that the implicit resynchronisation would occur with respect to the beginning of A6 and B8. Naturally, it is also possible that the sending peer sends an explicit reference point setting message to the receiving peer, which in the above example would e.g. identify data units A6 and B8.

Figure 4:
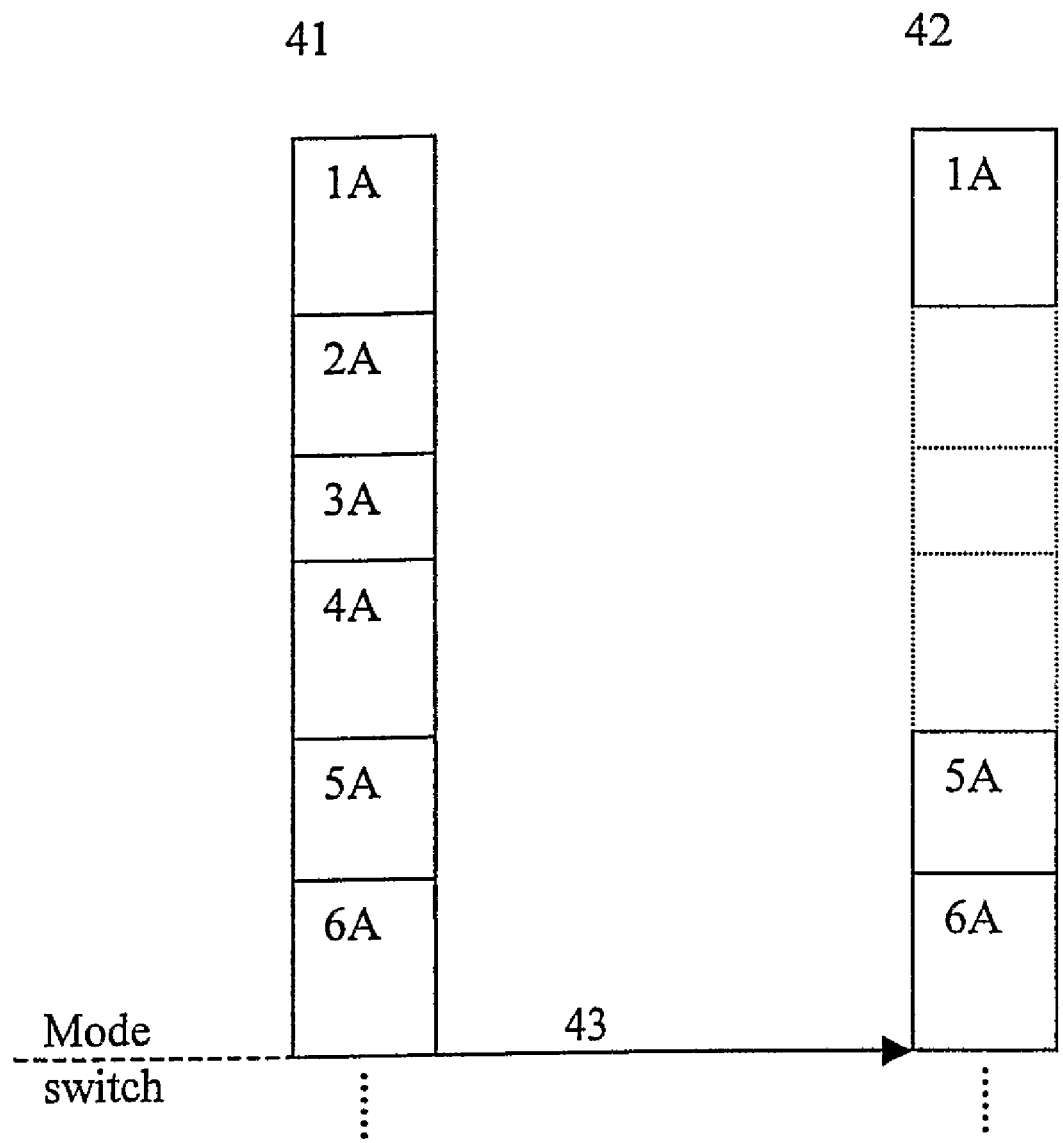

A second special case will be described with respect of FIG. 4. FIG. 4 shows a case where the data units of a given format (more specifically the payload of said data units) has a varying size. As an example, there may be an optional header field that is only used in certain cases and can have a variable length, such that the payload within a data unit is equally variable in order to accommodate the additional header field. An example of such a variable length header field is the length indicator field in the WCDMA RLC (radio Link Control) protocol. Consequently, the reference synchronization between format A and format B requires keeping track of the data unit size. At the side of the sending peer this is always known, and therefore no problem. However, at the side of the receiving peer this information is only available if the data units have been received correctly. If data units get lost or are damaged, then this information is not known to the receiving peer. Such a situation is shown in FIG. 4, where the data units of format A have a varying size, and it is assumed that data units 2A, 3A, 4A were not correctly received by the receiver in sequence 42.

This problem can be solved by the use of the reference point synchronization message already mentioned earlier. In the case of FIG. 4, the reference point synchronization message 43 is sent at the point of time of a mode switch. The reference point synchronization message contains information on the change in reference point due to the variable data unit size. As an example, if the size of data units 1A and 4A is the standard size, and data units 2A and 3A are respectively decreased by predetermined factors, then the reference point synchronization message 43 could simply indicate the amount of size reduction in data units 2A and 3A.

The above-described features of the invention can be implemented in data unit transmission devices that act as sending peers and/or receiving peers in the form of hardware, software or any suitable combination of hardware and software. According to a preferred embodiment, the present invention is embodied in the form of a computer program executable on a data unit transmission device.

Figure 5:
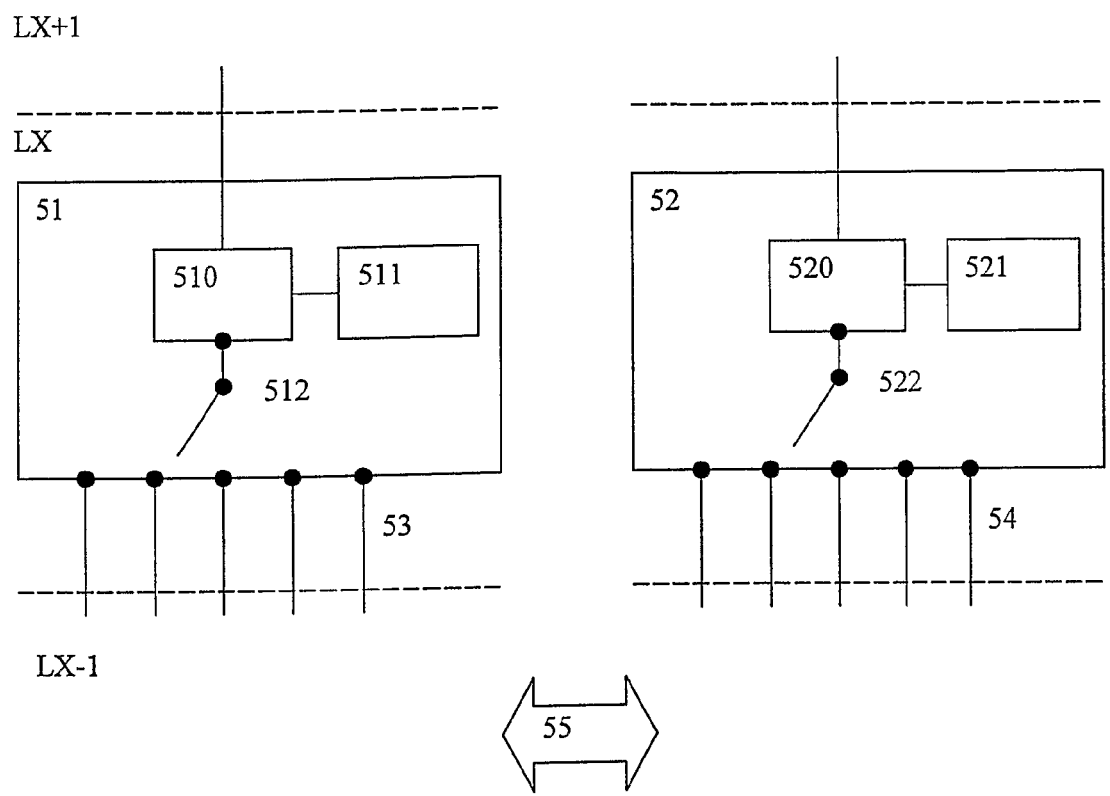

The present invention can especially be implemented in the context of the sending peer 51 and receiving peer 52 shown in FIG. 5. More specifically, the control part 511 can be arranged to operate as a record keeping part that simultaneously maintains the above-mentioned first and second record. Element 512 represents a switching part for dynamically switching between the above-described first and second transmission mode, and the data unit generating part 510 can be arranged to act a data unit output part that is equipped such that after the switching part 512 switches from a first transmission to a second transmission mode the output part 510 continues the transmission with a given data unit of one of the second sequences comprising a position indicator such that the given data unit comprises a data symbol immediately following the last data symbol of the data symbol stream that was sent in the data unit of said first format last sent before said switching, and that after the switching part 512 switches from the second transmission mode to the first transmission mode, the output part 510 continues the transmission with a given data unit of one of the first sequences comprising a position indicator such that the given data unit comprises a data symbol immediately following the last data symbol of the data symbol stream that was sent in the data unit of the second format last sent before the switching.

The control part 511 can especially be arranged to act as an information processor for determining data symbols of format A in terms of sequence position identifiers associated with format B and vice versa.

Equally, the control part 521 of receiving peer 52 can act as a sequence position identifier for identifying sequence position indicators in received data units, as a switching detector for detecting a switch in transmission mode at the sending peer. The element 520 of receiving peer 52 acts as a data symbol stream reconstruction part for reconstructing the data symbol stream on the basis of the sequence position indicators and the switching detected by control part 521. The control part 521 may equally act as a message generator for generating and sending receiver status messages to the sending peer.

Although the present invention has been described with respect to detailed embodiments, it is by no means restricted thereto, as the invention is defined by the appended claims. Furthermore, reference numerals in the claims serve to make the claims easier to read, but are not intended to have any limiting effect.

The invention claimed is:

1. A method of controlling a sending peer of a data unit transmission protocol, said sending peer dividing a continuous data symbol stream into data units of at least a first format and a second format and sending said data symbol stream in the form of said data units of said first format or said second format to a receiving peer, comprising:
    maintaining a first record of said data symbol stream in terms of one or more first sequences of data units of said first format,
    simultaneously maintaining a second record of said data symbol stream in terms of one or more second sequences of data units of said second format, where said first record and said second record have a common reference point to said data symbol stream,
    dynamically switching between a first transmission mode for sending data units of said first format and a second transmission mode for sending data units of said second format, where each sent data unit of said first format comprises a sequence position indicator that indicates a position in one of said first sequences and each sent data unit of said second format comprises a sequence position indicator that indicates a position in one of said second sequences, where
    after switching from said first transmission mode to said second transmission mode, the transmission continues with a given data unit of one of said second sequences comprising a position indicator such that said given data unit comprises a data symbol immediately following a last data symbol of said data symbol stream that was sent in the data unit of said first format last sent before said switching, and
    after switching from said second transmission mode to said first transmission mode, the transmission continues with a given data unit of one of said first sequences comprising a position indicator such that said given data unit comprises a data symbol immediately following the last data symbol of said data symbol stream that was sent in the data unit of said second format last sent before said switching.

2. The method of claim 1, wherein said common reference point is implicitly defined with respect to said sequence position indicators.

3. The method of claim 1, wherein said sending peer sends a reference point synchronization message to said receiving peer for setting said reference point.

4. The method of claim 1, wherein said sending peer is a link layer peer.

5. The method of claim 1, wherein said data units of said first format are sent over one or more first transmission channels and said data units of said second format are sent over one or more second transmission channels.

6. The method of claim 1, wherein upon switching from one of said first and second transmission modes to the other of said first and second transmission modes, a message indicating an associated switching in data unit format is sent by said sending peer.

7. The method of claim 1, wherein each data unit sent by said sending peer comprises a format type indicator.

8. The method of claim 1, wherein said second record comprises a first and a second of said second sequences of said data units of said second format, said second of said second sequences being offset from said first of said second sequences by a predetermined offset amount with respect to said reference point.

9. The method of claim 8, wherein after switching from said first transmission mode to said second transmission mode, said sending peer determines the given data unit of said first of said second sequences that comprises the data symbol immediately following the last data symbol of said data symbol stream that was sent in the last sent data unit of said first format, and determines the given data unit of said second of said second sequences that comprises the data symbol immediately following the last data symbol of said data symbol stream that was sent in the last sent data unit of said first format, determines which of said given data units comprises less data symbols already sent with the last data unit of said first format, and continues the transmission with that one sequence of said second sequences to which the given data unit with less of said data symbols belongs.

10. The method of claim 1, wherein each data unit sent by said sending peer comprises an offset indicator.

11. The method of claim 1, wherein said receiving peer sends receiver status messages to said sending peer, said receiver status messages comprising information on the receipt of one or more of said data units, said data units being identified in terms of sequence position indicators associated with one of said first sequences, said method further comprising
    a retransmission procedure for retransmitting data units on the basis of said receiver status messages, and a procedure for determining one or more second sequence position indicators associated with one of said second sequences on the basis of a given first sequence position indicator, where the one or more data units of said second format associated with said one or more second sequence position indicators cover all of the data symbols contained in the given data unit of said first format associated with said first sequence position indicator, where said retransmission procedure retransmits said data units of said second format associated with said one or more second sequence position indicators.

12. A method of controlling a receiving peer of a data unit transmission protocol, where said receiving peer receives a continuous data symbol stream in the form of data units of a first format or a second format from a sending peer, the method comprising:
    identifying a sequence position indicator in each received data unit, said sequence position indicator indicating a position of said received data unit in a respective sequence to which said received data unit belongs, where said data units of said first format belong to one of one or more first sequences of data units of said first format, and said data units of said second format belong to one of one or more second sequences of data units of said second format,
    detecting a switching of said sending peer between a first transmission mode for sending data units of said first format and a second transmission mode for sending data units of said second format, and reconstructing said data symbol stream on the basis of said identified sequence position indicators and said detected switching.

13. The method of claim 12, wherein said receiving peer is a link layer peer.

14. The method of claim 12, wherein said data units of said first format are sent over one or more first transmission channels, said data units of said second format are sent over one or more second transmission channels, and said step of detecting said switching comprises determining over which transmission channel said data units are received.

15. The method of claim 12, said step of detecting said switching comprises detecting a message sent by said sending peer indicating an associated switching in data unit format.

16. The method of claim 12, wherein each data unit sent by said sending peer comprises a format type indicator, and said step of detecting said switching comprises monitoring said format type indicators.

17. The method of claim 12 one, wherein said reconstructing is further based on a common reference point of said one or more first sequences and said one or more second sequences to said data symbol stream.

18. The method of claim 17, wherein said common reference point is implicitly defined with respect to said sequence position indicators.

19. The method of claim 17, wherein said receiving peer receives a reference point synchronization message from said sending peer and sets said common reference point on the basis of said reference point synchronization message.

20. The method of claim 17, wherein said step of reconstructing further comprises a step of identifying duplicate data symbols contained in data symbols of said first format and data symbols of said second format on the basis of said common reference point.

21. The method of claim 12, wherein said step of reconstructing comprises a step of identifying duplicate data symbols contained in data symbols of said first format and data symbols of said second format on the basis of dedicated messages sent from said sending peer to said receiving peer that identify said duplicate data symbols.

22. The method of claim 12, wherein said receiving peer sends receiver status messages to said sending peer, said receiver status messages comprising information on the receipt of one or more of said data units, said method further comprising a procedure for determining one or more second sequence position indicators associated with one of said second sequences on the basis of a first sequence position indicator associated with one of said first sequences, where the one or more data units of said second format associated with said determined one or more second sequence position indicators cover all of the data symbols contained in the data unit of said first format associated with said first sequence position indicator, for identifying in said receiver status messages said data unit of said first format in terms of said determined one or more second sequence position indicators.

23. The method of claim 22, further comprising a procedure for determining one or more first sequence position indicators associated with one of said first sequences on the basis of a second sequence position indicator associated with one of said second sequences, where the one or more data units of said first format associated with said determined one or more first sequence position indicators cover all of the data symbols contained in the data unit of said second format associated with said second sequence position indicator, for identifying in said receiver status messages said data unit of said second format in terms of said determined one or more first sequence position indicators.

24. The method of claim 12 further comprising a procedure for generating receiver status messages comprising one or both of said first and second sequence position indicators depending on one or more predetermined optimisation functions.

25. A data unit sender comprising
a sending peer of a data unit transmission protocol and the data unit sender being arranged for
dividing a data symbol stream into data units of at least a first format and a second format, and
sending said data symbol stream in the form of said data units of said first format or said second format and comprising a record keeping part arranged for
maintaining a first record of said data symbol stream in terms of one or more first sequences of data units of said first format, and
for simultaneously maintaining a second record of said data symbol stream in terms of one or more second sequences of data units of said second format, where said first record and said second record have a common reference point to said stream.

26. The data unit sender of claim 25, comprising
a switching part for dynamically switching between a first transmission mode for sending data units of said first format and a second transmission mode for sending data units of said second format, where each sent data unit of said first format comprises a sequence position indicator that indicates a position in one of said first sequences and each sent data unit of said second format comprises a sequence position indicator that indicates a position in one of said second sequences, and
a data unit output part arranged such that
after said switching part switches from said first transmission mode to said second transmission mode, said data unit output part continues the transmission with a given data unit of one of said second sequences comprising a position indicator such that said given data unit comprises a data symbol immediately following the last data symbol of said data symbol stream that was sent in the data unit of said first format last sent before said switching, and
after said switching part switches from said second transmission mode to said first transmission mode, said data unit output part continues the transmission with a given data unit of one of said first sequences comprising a position indicator such that said given data unit comprises a data symbol immediately following the last data symbol of said data symbol stream that was sent in the data unit of said second format last sent before said switching.

27. The data unit sender of claim 25, wherein said common reference point is implicitly defined with respect to said sequence position indicators.

28. The data unit sender of claim 25, further comprising a message sending part for sending a reference point synchronization message to said receiving peer for setting said reference point.

29. The data unit sender of claim 25, wherein said sending peer is a link layer peer.

30. The data unit sender of claim 25, wherein said data unit sender is connected to one or more first transmission channels for transmitting said data units of said first format and to one or more second transmission channels for transmitting said data units of said second format.

31. The data unit sender of claim 25, wherein said data unit sender is arranged to output a message indicating a switching in data unit format upon said switching part switching from one of said first and second transmission modes to the other of said first and second transmission modes.

32. The data unit sender of claim 25, wherein each data unit sent by said sending peer comprises a format type indicator.

33. The data unit sender of claim 25, wherein said second record comprises a first and a second of said second sequences of said data units of said second format, said second of said second sequences being offset from said first of said second sequences by a predetermined offset amount with respect to said reference point.

34. The data unit sender of claim 33, further comprising an information processor that is arranged such that after said switching part switches from said-first transmission mode to said second transmission mode, said information processor determines the given data unit of said first of said second sequences that comprises the data symbol immediately following the last data symbol of said data symbol stream that was sent in the last sent data unit of said first format, and determines the given data unit of said second of said second sequences that comprises the data symbol immediately following the last data symbol of said data symbol stream that was sent in the last sent data unit of said first format, determines which of said given data units comprises less data symbols already sent with the last data unit of said first format, and said sending peer continuing the transmission with that one sequence of said second sequences to which the given data unit with less of said data symbols belongs.

35. The data unit sender of claim 33, wherein said data unit sender is arranged such that each data unit sent by said sending peer comprises an offset indicator.

36. The data unit sender of claim 25, wherein said sending peer is arranged to receive receiver status messages from said receiving peer, said receiver status messages comprising information on the receipt of one or more of said data units, said data units being identified in terms of sequence position indicators associated with one of said first sequences, further comprising
 a retransmission part for retransmitting data units on the basis of said receiver status messages, and
 an information processor for determining one or more second sequence position indicators associated with one of said second sequences on the basis of a given first sequence position indicator, where the one or more data units of said second format associated with said one or more second sequence position indicators cover all of the data symbols contained in the given data unit of said first format associated with said first sequence position indicator,
 said retransmission part being arranged to retransmit said data units of said second format associated with said one or more second sequence position indicators.

37. A data unit receiver comprising a receiving peer of a data unit transmission protocol, where said receiving peer is arranged to receive a data symbol stream in the form of data units of a first format or a second format from a sending peer, the data unit receiver comprising:
 a sequence position identifier for identifying a sequence position indicator in each received data unit, said sequence position indicator indicating a position of said received data unit in a respective sequence to which said received data unit belongs, where said data units of said first format belong to one of one or more first sequences of data units of said first format, and said data units of said second format belong to one of one or more second sequences of data units of said second format,
 a switching detector for detecting a switching of said sending peer between a first transmission mode for sending data units of said first format and a second transmission mode for sending data units of said second format, and—
 a data symbol stream reconstruction part for reconstructing said data symbol stream on the basis of said identified sequence position indicators and said detected switching.

38. The data unit receiver of claim 37, wherein said receiving peer is a link layer peer.

39. The data unit receiver of claim 37, wherein said data unit receiver is connected to one or more first transmission channels for receiving said data units of said first format and to one or more second transmission channels for receiving said data units of said second format.

40. The data unit receiver of claim 37, wherein said switching detector is arranged for detecting a message sent by said sending peer indicating an associated switching in data unit format.

41. The data unit receiver of claim 37, wherein each data unit sent by said sending peer comprises a format type indicator, and said switching detector is arranged for monitoring said format type indicators.

42. The data unit receiver of claim 37, wherein data symbol stream reconstruction part is further arranged to reconstruct said data symbol stream on the basis of a common reference point of said one or more first sequences and said one or more second sequences to said data symbol stream.

43. The data unit receiver of claim 42, wherein said common reference point is implicitly defined with respect to said sequence position indicators.

44. The data unit receiver of claim 42, wherein said receiving peer has a receiving part for receiving a reference point synchronization message from said sending peer and a setting part for setting said common reference point on the basis of said reference point synchronization message.

45. The data unit receiver of claim 42, wherein said data symbol stream reconstruction part is arranged to identify duplicate data symbols contained in data symbols of said first format and data symbols of said second format on the basis of said common reference point.

46. The data unit receiver of claim 37, wherein said data symbol stream reconstruction part is arranged for identifying duplicate data symbols contained in data symbols of said first format and data symbols of said second format on the basis of dedicated messages sent from said sending peer to said receiving peer that identify said duplicate data symbols.

47. The data unit receiver of claim 37, further comprising
 a message generator for generating and sending receiver status messages to said sending peer, said receiver status messages comprising information on the receipt of one or more of said data units, and
 an information processor for determining one or more second sequence position indicators associated with one of said second sequences on the basis of a first sequence position indicator associated with one of said first sequences, where the one or more data units of said second format associated with said determined one or more second sequence position indicators cover all of the data symbols contained in the data unit of said first format associated with said first sequence position indicator, for identifying in said receiver status messages said data unit of said first format in terms of said determined one or more second sequence position indicators.

48. The data unit receiver of claim 47, said information processor further being arranged for determining one or more first sequence position indicators associated with one of said first sequences on the basis of a second sequence position indicator associated with one of said second sequences, where the one or more data units of said first format associated with said determined one or more first sequence position indicators cover all of the data symbols contained in the data unit of said second format associated with said second sequence position indicator, for identifying in said receiver status messages said data unit of said second format in terms of said determined one or more first sequence position indicators.

49. The data unit receiver of claim 47, wherein said message generator is further arranged for generating receiver status messages comprising one or both of said first and second sequence position indicators depending on one or more predetermined optimisation functions.

* * * * *

UNITED STATES PATENT AND TRADEMARK OFFICE
CERTIFICATE OF CORRECTION

PATENT NO. : 7,656,874 B2
APPLICATION NO. : 10/598493
DATED : February 2, 2010
INVENTOR(S) : Wiemann et al.

Page 1 of 1

It is certified that error appears in the above-identified patent and that said Letters Patent is hereby corrected as shown below:

In Column 2, Line 50, delete "SUMMARY OF THE INVENTION".

In Column 15, Line 14, in Claim 17, delete "12 one," and insert -- 12, --, therefor.

In Column 16, Line 4, in Claim 25, after "dividing a" insert -- continuous --.

In Column 17, Line 53, in Claim 37, after "receive a" insert -- continuous --.

Signed and Sealed this

Thirtieth Day of November, 2010

David J. Kappos
*Director of the United States Patent and Trademark Office*